United States Patent [19]

Westermann et al.

[11] 4,166,141
[45] Aug. 28, 1979

[54] METHOD OF CHILL STABILIZING A MALT BEVERAGE

[75] Inventors: Donald H. Westermann, Brookfield; Nicolaas J. Huige, Glendale, both of Wis.

[73] Assignee: Jos. Schlitz Brewing Company, Milwaukee, Wis.

[21] Appl. No.: 824,393

[22] Filed: Aug. 15, 1977

[51] Int. Cl.² ............................................. C12H 1/04
[52] U.S. Cl. .................................. 426/422; 426/330.4; 426/423
[58] Field of Search .................... 426/321, 330.4, 16, 426/422, 423, 424; 99/277.1, 277.2; 210/20

[56] References Cited

U.S. PATENT DOCUMENTS

| 3,374,052 | 3/1968 | Fan et al. ......................... 210/20 X |
| 3,498,795 | 3/1970 | Walter .............................. 426/422 X |
| 3,878,310 | 4/1975 | Field et al. ........................... 426/422 |

Primary Examiner—David M. Naff
Attorney, Agent, or Firm—Andrus, Sceales, Starke & Sawall

[57] ABSTRACT

Malt beverages such as beer containing small quantities of proteinaceous and tannin materials which react to form a precipitate that renders the beverage hazy or cloudy when chilled are stabilized by passing the beverage through a fluidized bed of adsorbent particles such as polyvinylpyrrolidone or silica gel to adsorb the proteinaceous and/or tannin materials. A portion of the adsorbent bed containing adsorbed material is continuously removed and regenerated by separating the adsorbed material from the adsorbant particles, and the regenerated adsorbant particles are returned to the bed. The use of the fluidized bed provides a high concentration of adsorbant to promote increased efficiency, while enabling the adsorbant to be continuously regenerated and reused.

3 Claims, 1 Drawing Figure

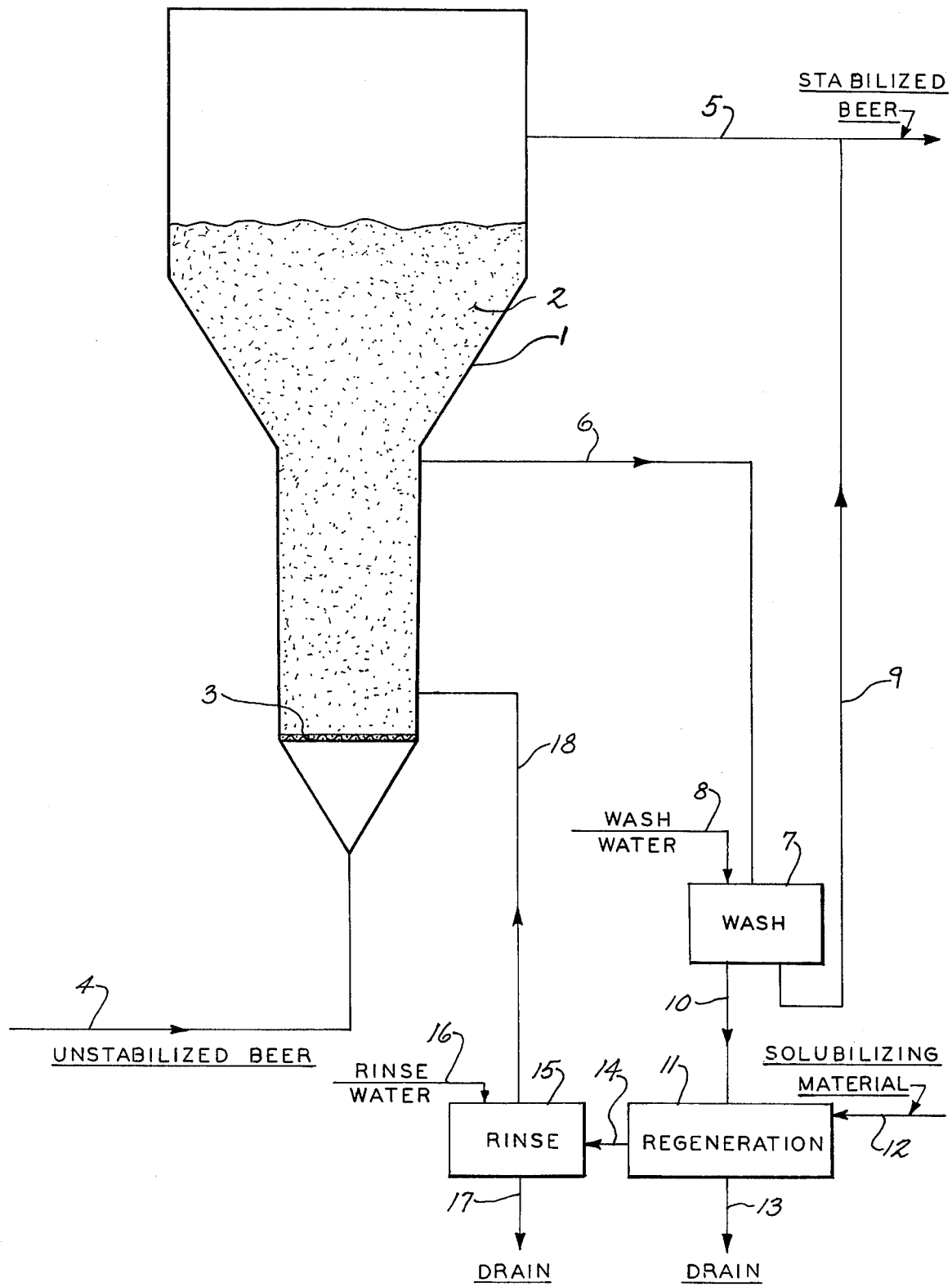

4,166,141

METHOD OF CHILL STABILIZING A MALT BEVERAGE

BACKGROUND OF THE INVENTION

Malt beverages, such as beer, contain small quantities of proteinaceous material and tannins which can react to form a precipitate that renders the beer hazy or cloudy. To prevent the formation of this haze or precipitate, adsorbant materials, commonly referred to as chill stabilizing agents, have been added to the beer prior to filtering to remove the tannins and/or proteinaceous material and thereby prevent the formation of the haze. Polyvinylpolypyrrolidone (PVPP) has been used in the past as an adsorbant for tannins, while silica gel has seen extensive use as an adsorbant for the proteinaceous materials.

In the traditional practice, the adsorbant is added to the beer as a slurry and is removed during filtration as part of the filter heel, which is a mixture of the adsorbant particles containing the adsorbed material, as well as filter aid particles, such as diatamaceous earth. Because of the mixture of materials in the filter heel, it has not been practical to recover the adsorbant for reuse.

As polyvinylpolypyrrolidone is a relatively expensive material, attempts have been made in the past to use PVPP in the filter in the form of sheets which can be regenerated. While the sheets are capable of being removed and regenerated for reuse, the sheets, during use, become progressively contaminated with the adsorbed material, so that the PVPP loses its efficiency, with the result that the removal of tannins is not uniform and consistent.

SUMMARY OF THE INVENTION

The invention relates to an improved method of chill stabilizing a beverage, such as beer. In accordance with the invention, the beer is passed through a fluidized bed of an adsorbant, which can be a material such as PVPP or silica gel, to remove the proteinaceous material and/or tannins. The density of the bed and flow of the beer is controlled so that the proteinaceous material and/or tannins will be substantially fully adsorbed during the residence time of the beer in the fluidized bed.

A portion of the bed is continuously removed and the adsorbant particles are washed with water to remove the residual beer which can be returned and reunited with the stabilized beer. The adsorbed material is then removed or separated from the adsorbant particles by reaction with an alkaline material, and the adsorbant particles are then subjected to a water rinse to remove the reaction product. Following this, the regenerated adsorbant particles are returned to the fluidized bed.

As the adsorbant or stabilizing agent is recycled, the process uses substantially smaller quantities of the adsorbant as compared to conventional processes, thereby reducing the overall cost of the brewing process, as well as reducing the total mass of materials requiring physical handling in and out of the brewery. The adsorbant need only be replenished due to losses resulting from abrasion or through loss of adsorbant properties.

As the beer percolates through the bed, intimate contact is achieved between the materials promoting improved adsorbtion efficiency.

Due to the recirculation and regeneration of the adsorbant, a steady state situation is established in which the adsorbtion efficiency is constant with time resulting in a more uniform and consistent treatment.

Other objects and advantages will appear in the course of the following description.

DESCRIPTION OF THE DRAWINGS

The drawings illustrate the best mode presently contemplated of carrying out the invention.

In the drawings:

The drawing is a flow sheet illustrating the process of the invention.

DESCRIPTION OF THE PREFERRED EMBODIMENT

As shown in the flow sheet, a vessel 1 contains a bed 2 of particles of an adsorbant or stabilizing agent, such as polyvinylpolypyrrolidone (PVPP) or silica gel. The particles of the adsorbant have a size generally of about 1 mm in diameter, and the particles can consist solely of the adsorbant or can be in pelletized form, in which smaller particles of the adsorbant are bonded together with a binder in the form of pellets. The adsorbant or stabilizing agent is retained on a screen or septum 3 which is located in the lower end of the vessel 1, and the unstabilized beer is introduced into the bottom of the vessel through line 4 while the stabilized beer is discharged from the upper end of the vessel through line 5.

As shown in the drawings, the lower section of the vessel 1 is generally cylindrical in cross section and is connected by a tapered central section to an upper section of larger cross sectional area. With this configuration, a higher mass velocity is developed in the lower, smaller diameter section, which increases the turbulence and surface contact between the liquid and adsorbant particles in that zone, while a lower mass velocity is obtained in the upper larger diameter section to prevent the adsorbant particles from being carried from the vessel through line 5 with the stabilized beer.

The density of the bed 2 and the flow rate of the beer through the bed are controlled so that the residence time of the beer in contact with the adsorbant particles will substantially fully remove the proteinaceous material and/or tannins from the beer. By removal of the proteinaceous material, or removal of the tannins, or both, the reaction between these materials will be eliminated and the development of the chill haze will be prevented.

In accordance with the invention, a portion of the bed 2 is continuously removed from the vessel 1 through a line 6 and is conducted to a wash station 7 where the residual beer is washed from the adsorbant particles. The wash station 7 includes a solid-liquid separating device, such as a filter or centrifuge, and water is introduced to the station 7 through line 8, and the liquid phase, which consists of residual beer and water, is separated from the adsorbant particles.

As shown in the flow sheet, the separated liquid phase is conducted from wash station 7 through line 9 to the line 5 where it is mixed with the stabilized beer, while the adsorbant particles are delivered through line 10 to a regeneration station 11 where the adsorbed material is removed from the adsorbant particles. In the regeneration station 11, the adsorbant particles are contacted with a substance which will react with the adsorbed material to solubilize and remove the adsorbed material and regenerate the adsorbant particles. When using PVPP, an alkaline wash, such as sodium hydroxide solution, can be employed to react with and remove the adsorbed material.

The regeneration station 11 includes a conventional solid-liquid separating device, such as filter or centrifuge, which operates to separate the liquid phase from the regenerated adsorbant particles, and the flow rates of the adsorbant particles and alkaline wash are correlated with the capacity of the separating device so that the adsorbed material is completely removed from the adsorbant particles during the residence time of the adsorbant particles in the station 11.

As illustrated in the drawing, the alkaline wash, or other substance capable of reacting with the adsorbed material, is introduced into the regeneration station through line 12, and the residual liquid is withdrawn from the station 11 through a line 13, while the regenerated adsorbant particles are conveyed through line 14 to a rinse station 15 where the particles are rinsed with water prior to return to the bed 2 in vessel 1.

Rinse station 15 also includes a conventional solid-liquid separating device, and the rinse water is introduced to the station 15 through line 16, while the liquid residue is withdrawn through line 17. The washed particles are then returned to the lower portion of the bed in vessel 1 through line 18.

Suitable pumps, not shown in the flow sheet, can be employed to convey the adsorbant particles from the vessel 1 through the series of station 7, 11 and 15 and back to the vessel.

It is preferred to maintain the regeneration system closed, and under pressure, to prevent the introduction of air into the bed 2 and eliminate foaming of the beer.

As the adsorbant or stabilizing agent is continuously recycled, the system has the advantage of utilizing only very small quantities of the stabilizing agent as compared to conventional processes in which the stabilizing agent is not regenerated. It is only necessary to replenish those small amounts of the stabilizing agent lost through abrasion or fracture. This provides a substantial economic advantage over systems in which the stabilizing agent is not regenerated.

As the fluidized bed is continuously being agitated by the flow of beer therethrough, a more intimate contact between the beer and the stabilizing agent is provided which increases the efficiency of the adsorption.

The continuous regeneration of the stabilizing agent allows a steady state situation to be established in which the average adsorbtion capacity of the stabilizing agent is constant with time providing a more uniform stabilization of the beer, as opposed to batch systems in which the entire mass of the stabilizing agent is used for a given period during which the adsorbant rate continuously decreases.

Various modes of carrying out the invention are contemplated as being within the scope of the following claims particularly pointing out and distinctly claiming the subject matter which is regarded as the invention.

We claim:

1. A method of stabilizing a malt beverage, comprising the steps of forming in a vessel a bed of particles of an adsorbant material selected from the group consisting of polyvinylpyrrolidone and silica gel, flowing the beverage upwardly through the bed at a rate sufficient to fluidize the bed and said haze forming substances being adsorbed on said particles to stabilize the beverage, said vessel having a lower portion of smaller cross sectional area connected to an upper portion of larger cross sectional area whereby there is maintained a higher mass velocity of the beverage in the lower portion of the vessel than in the upper portion of the vessel, continuously removing particles from the upper portion of said bed, contacting the particles with a solubilizing material capable of solubilizing the haze forming substances adsorbed on the particles to thereby regenerate said particles, and continuously returning the regenerated adsorbant particles to the lower portion of said bed.

2. The method of claim 1, further including the step of washing the particles with water after removal from the bed to remove residual beverage from the particles and returning said residual beverage to the stabilized beverage.

3. The method of claim 1, wherein the adsorbant material is polyvinylpolypyrrolidone and the solubilizing material is an alkaline solution.

* * * * *